(12) United States Patent
Holbrook et al.

(10) Patent No.: US 9,185,139 B2
(45) Date of Patent: Nov. 10, 2015

(54) LOCATION BASED ROUTING

(75) Inventors: Brian Holbrook, Keller, TX (US);
Priscilla Lau, Fremont, CA (US);
Mingxing Li, San Jose, CA (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 591 days.

(21) Appl. No.: 12/758,867

(22) Filed: Apr. 13, 2010

(65) Prior Publication Data
US 2011/0249666 A1  Oct. 13, 2011

(51) Int. Cl.
| | |
|---|---|
| *H04W 4/22* | (2009.01) |
| *H04M 11/04* | (2006.01) |
| *H04W 64/00* | (2009.01) |
| *H04L 29/06* | (2006.01) |
| *H04L 29/08* | (2006.01) |
| *H04M 3/42* | (2006.01) |

(52) U.S. Cl.
CPC ............ *H04L 65/1006* (2013.01); *H04L 67/18* (2013.01); *H04L 69/22* (2013.01); *H04M 3/42034* (2013.01); *H04W 64/00* (2013.01)

(58) Field of Classification Search
CPC ............ H04L 65/1006; H04W 64/00; H04M 3/42034
USPC ......................................................... 707/622
See application file for complete search history.

(56) References Cited

U.S. PATENT DOCUMENTS

| | | | | |
|---|---|---|---|---|
| 2004/0205193 | A1* | 10/2004 | Hurtta et al. .................. | 709/227 |
| 2005/0003797 | A1* | 1/2005 | Baldwin .................... | 455/404.1 |
| 2005/0169248 | A1* | 8/2005 | Truesdale et al. ............ | 370/352 |
| 2006/0142011 | A1* | 6/2006 | Kallio ........................... | 455/445 |
| 2006/0268902 | A1* | 11/2006 | Bonner ......................... | 370/401 |
| 2007/0153813 | A1* | 7/2007 | Terpstra et al. ............... | 370/401 |
| 2008/0159262 | A1* | 7/2008 | Crable et al. ................. | 370/352 |
| 2009/0191841 | A1* | 7/2009 | Edge et al. ................. | 455/404.1 |
| 2010/0153567 | A1* | 6/2010 | Lu et al. ........................ | 709/229 |
| 2010/0157986 | A1* | 6/2010 | Rao et al. ...................... | 370/352 |

* cited by examiner

*Primary Examiner* — Wutchung Chu
*Assistant Examiner* — Jason Harley

(57) ABSTRACT

A method may include receiving a session initiation protocol (SIP) Invite message associated with a call and determining that the call involves location based processing. The method may also include identifying location information associated with the call based on header information included in the SIP Invite message and identifying a location ID based on the location information. The method may further include modifying the SIP Invite message to include the location ID, identifying a call type associated with the call and identifying a mobile switching center to which the SIP Invite message is to be forwarded based on the call type and the location information.

19 Claims, 5 Drawing Sheets

LOCATION BASED ROUTING

BACKGROUND INFORMATION

Routing calls through networks has become increasingly complex. For example, in circuit switched mobile networks, certain calls are routed based on the originating location of the caller. In conventional wireless systems (e.g., code division multiple access (CDMA) systems, global system for mobile communications (GSM) systems), a mobile switching center (MSC) identifies the cell and sector in which the caller is located and is able to route the calls to the appropriate location based on the location of the call origination.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to supporting location based routing in a network. In one implementation, a call from a party, such as a voice over Internet protocol (VoIP) call, may be received by a network device. The network device may generate a location identifier based on a cell identifier and sector identifier associated with the call origination location. The network device may also modify a header associated with the call to include the call origination location identifier. The call may be forwarded to a particular mobile switching center based on the call type and the call origination location. The mobile switching center may then forward the call to the appropriate destination.

Figure 1:
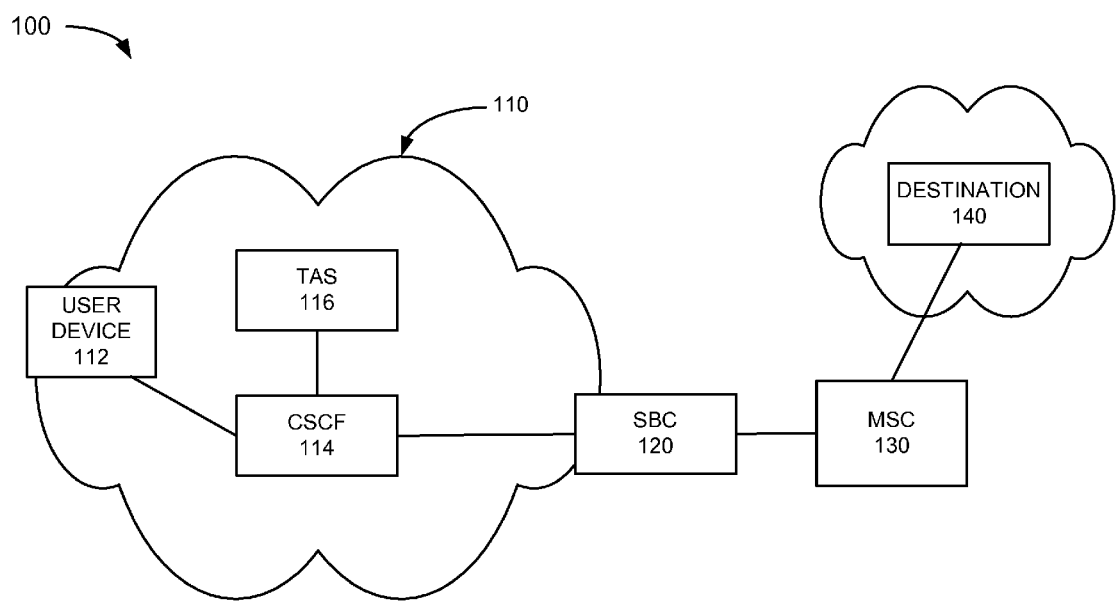
FIG. 1 illustrates an exemplary network in which systems and methods described herein may be implemented.

FIG. 1 is a block diagram of an exemplary network 100 in which systems and methods described herein may be implemented. Network 100 may include network 110, session border controller 120 (SBC), mobile switching center (MSC) 130 and destination 140. In an exemplary implementation, network 110 may represent a network associated with a service provider that provides various services, such as Internet protocol (IP) related services, value added services, etc. For example, in one implementation, network 110 may represent an Internet Protocol Multimedia Subsystem (IMS) network (also referred to herein as IMS 110) that provides services to IMS subscribers (referred to herein as subscribers). Such services may include VoIP services for mobile or fixed location subscribers, wireless communication services, etc.

IMS 110 may include one or more wired, wireless and/or optical networks that are capable of receiving and transmitting data, voice and/or video signals, including multi-media signals that include voice, data and video information. For example, IMS 110 may include one or more public switched telephone networks (PSTNs) or other type of switched network. IMS 110 may also include one or more wireless networks and may include a number of transmission towers for receiving wireless signals and forwarding the wireless signals toward the intended destinations. IMS 110 may further include one or more satellite networks, one or more packet switched networks, such as an IP-based network, a local area network (LAN), a wide area network (WAN), a personal area network (PAN) (e.g., a wireless PAN), an intranet, the Internet, or another type of network that is capable of transmitting data.

Referring to FIG. 1, IMS 110 may include user device 112, call session control function (CSCF) 114 and telephone application server (TAS) 116. As described above, in an exemplary implementation, IMS 110 may provide mobile and fixed users with multimedia services. For example, IMS 110 may provide VoIP related processing of calls for VoIP users, such as a caller at user device 112.

User device 112 may include any type of device that is able to transmit and receive data, such as text data, video data, image data, audio data, multi-media data, etc. For example, user device 112 may include some type of computer, such as a personal computer (PC), laptop computer, etc., a personal digital assistant (PDA), a web-based appliance, a mobile terminal (e.g., a cellular telephone), etc. User device 112 may also include a telephone, such as Internet protocol (IP) based phone (e.g., a VoIP based telephone, such as a session initiation protocol (SIP) based telephone, etc.), a wireless telephone, a public switched telephone network (PSTN) based telephone, etc., used to make and receive telephone calls.

CSCF 114 may include one or more call session control components used to process calls in network 110 (e.g., calls from/to IMS subscribers). CSCF 114 may perform call session control processing and may be responsible for parsing a session (e.g., a SIP session) and applying logic (e.g., business logic, service logic, operational logic, etc.) on a per call or per event basis. The outcome of the session control processing may be to route call data to the appropriate components, modify SIP headers and/or append SIP headers and values to the call data, as described in detail below.

CSCF 114 may be implemented across multiple devices or via a single device. In an exemplary implementation, CSCF 114 may receive SIP messages from subscribers (e.g., via user device 112) and modify the SIP messages for calls that are to be forwarded to locations based on the originating locations of the callers, as described in detail below.

TAS 116 may perform call processing associated with calls from subscribers, such as a subscriber associated with user device 112. In an exemplary implementation, TAS may perform one or more lookups to identify information associated with routing calls based on the location of the caller, as described in detail below.

SBC 120 may provide control of the boundary between different service providers' networks, such as IMS 110 and another network. In an exemplary implementation, SBC 120 may provide signaling protocol inter-working between an IP-based (e.g., SIP-based) platform and other service provider networks, as well as control the transport boundary between service provider networks. SBC 120 may also provide security enforcement and/or other control features.

MSC 130 may receive and forwards calls, such as voice calls and data calls from/to subscribers in IMS 110. MSC 130 may interface with wired networks, such as the PSTN, and wireless networks to forward calls toward their intended destinations. Destination 140 may represent a destination device or system to which calls are forwarded in network 100. In an exemplary implementation, destination 140 may be associated with a destination for location based calls, as described in detail below.

The exemplary configuration illustrated in FIG. 1 is provided for simplicity. It should be understood that a typical network 100 and IMS 110 may include more or fewer devices than illustrated in FIG. 1. For example, a single user device 112, CSCF 114 and TAS 116 are shown in IMS 110 for simplicity. In addition, a single network 110, SBC 120, MSC 130 and destination 140 are shown in network 100 for simplicity. It should be understood that network 100 and IMS 110 may include a large number (e.g., hundreds or thousands) of user devices and a number of other networks. Network 100 may also include additional elements, such as networks, switches, routers, gateways, backend systems, etc., that aid in routing calls and/or information in network 100 and providing services to subscribers to services associated with network 110.

Figure 2:
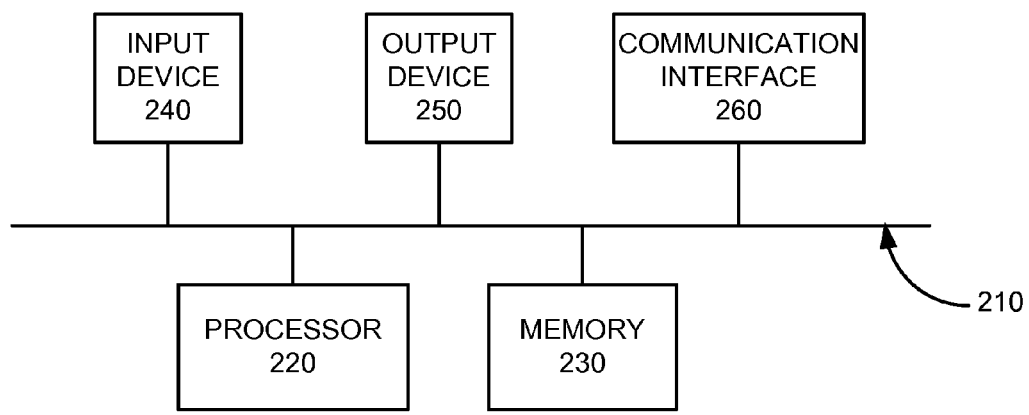
FIG. 2 illustrates an exemplary configuration of one or more of the components of FIG. 1.

FIG. 2 illustrates an exemplary configuration of TAS 116. Other devices in network 100, such as CSCF 114 may be configured in a similar manner. Referring to FIG. 2, TAS 116 may include bus 210, processor 220, memory 230, input device 240, output device 250 and communication interface 260. Bus 210 may include a path that permits communication among the elements of TAS 116.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information to TAS 116, such as a keyboard, a keypad, a mouse, a pen, a microphone, a touch screen, voice recognition and/or biometric mechanisms, etc. Output device 250 may include a mechanism that outputs information to the user, including a display, a printer, a speaker, etc.

Communication interface 260 may include any transceiver-like mechanism that TAS 116 may use to communicate with other devices (e.g., CSCF 114) via wired, wireless or optical mechanisms. In some implementations, communication interface 260 may include one or more radio frequency (RF) transmitters, receivers and/or transceivers and one or more antennas for transmitting and receiving RF data. Communication interface 260 may also include a modem or an Ethernet interface to a LAN or other mechanisms for communicating with elements in a network, such as network 110 or another network (e.g., network 100).

The exemplary configuration illustrated in FIG. 2 is provided for simplicity. It should be understood that TAS 116 (and CSCF 114) may include more or fewer devices than illustrated in FIG. 2. In an exemplary implementation, TAS 116 may perform operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
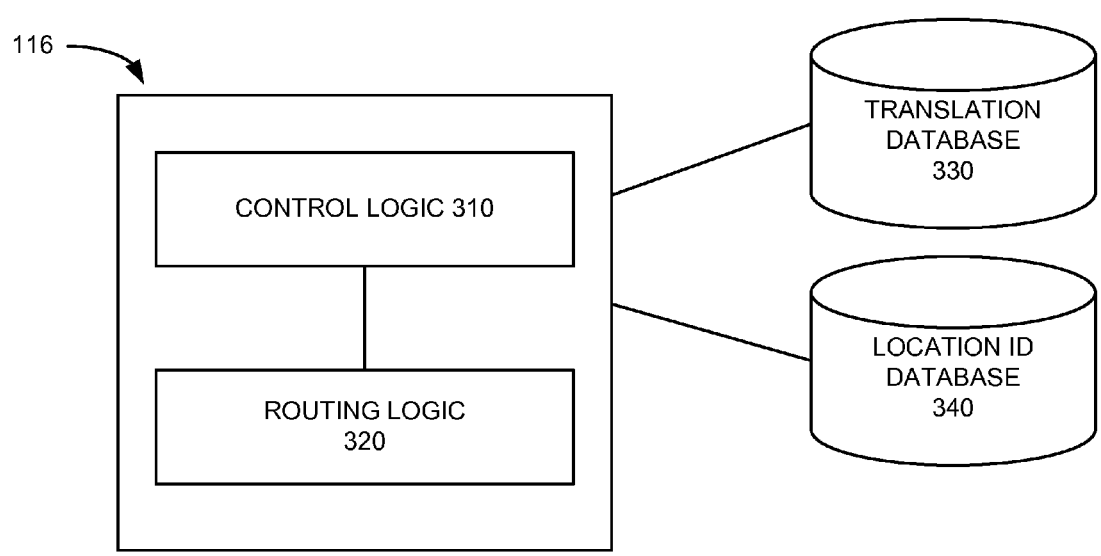
FIG. 3 illustrates an exemplary configuration of logic components implemented in one of the devices of FIG. 1.

FIG. 3 is an exemplary functional block diagram of TAS 116 according to an exemplary implementation. The logical blocks illustrated in FIG. 3 may be implemented in software, hardware, or a combination of hardware and software. For example, in one implementation, all or some of the logical blocks illustrated in FIG. 3 may be implemented by processor 220 (FIG. 2) executing software instructions stored in, for example, memory 230.

Referring to FIG. 3, TAS 116 may include control logic 310 and routing logic 320. Control logic 310 may receive messages from CSCF 114 (e.g., SIP messages) and query translation database 330 and/or location ID database 340 to identify information associated with routing a call to an appropriate destination that is dependent on the location of the caller. Databases 330 and 340 are illustrated as being located externally with respect to TAS 116. In other implementations, databases 330 and 340 may be included within TAS 116 (e.g., in memory 230). Routing logic 320 may receive information from control logic 310 and forward routing information to other devices, such as CSCF 114, as described in detail below.

Translation database 330 may include information that may be used to determine whether location based routing is applicable (e.g., different destinations for different call originating locations) and to translate or modify alphanumeric information, such as short codes, input by a caller according to a cell ID and/or sector ID associated with the location of the caller. Short codes may be special telephone numbers that are shorter than full ten digit telephone numbers. Short codes may be used by service providers to provide a shorter or easier way for callers to reach particular destinations. Translation database 330 may include information to translate short codes into PSTN routable telephone numbers, such as a ten digit telephone number.

Location ID database 340 may include information that correlates a cell ID and/or sector ID or other location information provided by the access network (e.g., Internet protocol (IP) address or WiFi Access Point identifier (ID)) into a location identifier. For example, location ID database 340 may store location identifiers that correspond to cell IDs and sector IDs associated with a particular geographic area serving wireless callers. In an exemplary implementation, the location IDs in location ID database 340 may be assigned by an operator associated with IMS 110. In some instances, the same location ID can be assigned to multiple cell ID/sector ID combinations. For example, a location ID may represent a particular zip code or other region that is larger than a region associated with a particular cell ID/sector ID.

Control logic 310 may access databases 330 and 340 to determine if a call can be routed dependently or independently of the caller's location and to obtain location-dependent routing information that may be used to route calls, such as VoIP calls whose destination is dependent on the location of the caller, as described in detail below.

Figure 4:
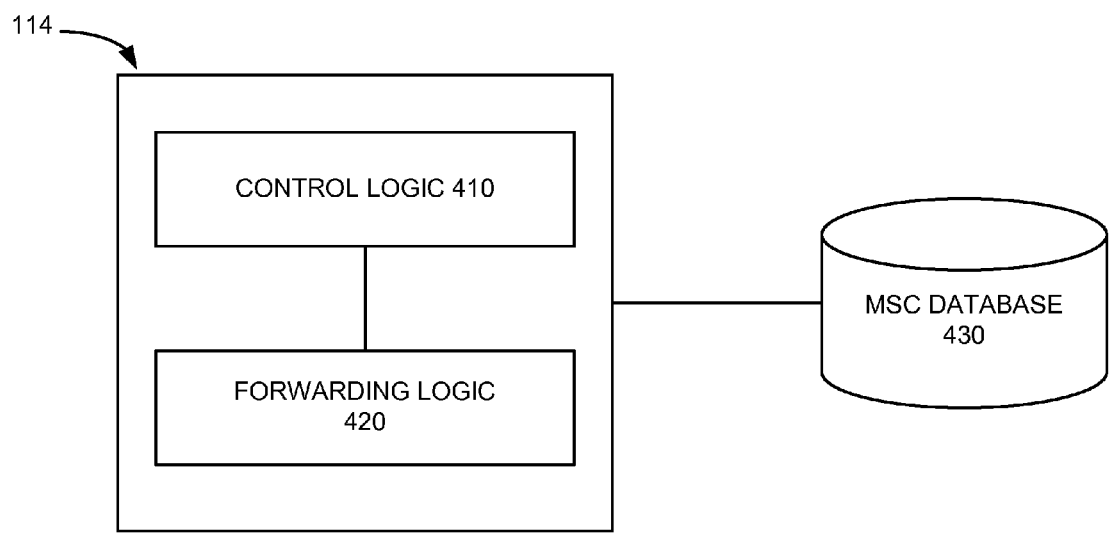
FIG. 4 illustrates an exemplary configuration of logic components implemented in another one of the devices of FIG. 1.

FIG. 4 is an exemplary functional block diagram of CSCF 114 according to an exemplary implementation. The logical blocks illustrated in FIG. 4 may be implemented in software, hardware, or a combination of hardware and software. For example, in one implementation, all or some of the logical blocks illustrated in FIG. 4 may be implemented by processor 220 (FIG. 2) executing software instructions stored in, for example, memory 230.

Referring to FIG. 4, CSCF 114 may include control logic 410 and forwarding logic 420. Control logic 410 may receive calls (e.g., VoIP calls) from user device 112, forward messages to TAS 116 and receive messages from TAS 116. Control logic 410 may query MSC database 430 to identify information associated with an appropriate MSC to which a call is to be forwarded. MSC database 430 is illustrated as being located externally with respect to CSCF 114. In other implementations, MSC database 430 may be included within CSCF 114 (e.g., in memory 230). Forwarding logic 420 may receive information from control logic 410 and forward information to other devices, such as TAS 116, SBC 120, MSC 130, etc., as described in detail below.

MSC database 430 may include information identifying various MSC associated with different call types. For example, one call type may be associated with a 411 call for directory assistance, another call type may be associated with a 611 call for a wireless operator's customer care center and still another call type may be associated with an 8YY call (e.g., an 8YY-XXX-XXXX toll free call, where the first three digits indicate a toll free call and the last seven digits represent the remaining portion of the toll free telephone number). MSC database 430 may store fully qualified domain names (FQDNs) for each of the MSCs identified in MSC database 430. Control logic 410 may use the FQDN of an appropriate MSC to modify a signaling messages associated with a call from a subscriber, as described in detail below.

Figure 5:
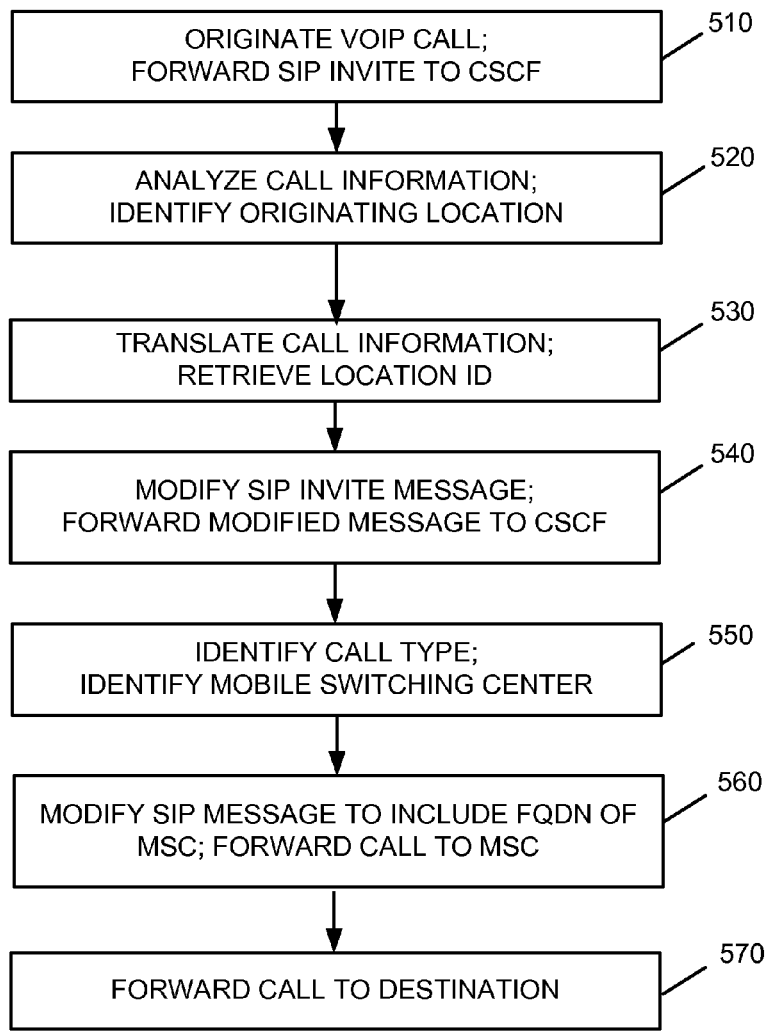
FIG. 5 is a flow diagram illustrating exemplary processing associated with the components of FIG. 1.

FIG. 5 is a flow diagram illustrating exemplary processing associated with network 100. Processing may begin with an IMS subscriber originating a call, such as a VoIP call (act 510). For example, a subscriber at user device 112 may initiate a call (e.g., by entering alphanumeric information into a keypad of user device 112) and user device 112 may send a SIP Invite message to CSCF 114 (act 510). In an exemplary implementation, the SIP Invite message may include a request Uniform Resource Identifier (R-URI) header with the fully qualified domain name (FQDN) of the home domain associated with user device 112. For example, the SIP Invite message may include the following information: <user input/dialed digits>@<home network FQDN>, where the input/dialed digits represent the digits or information input by the caller at user device 112. In addition, the SIP Invite message may include a P-Access Network Identifier (PANI) header that includes information identifying the access network and location. For an exemplary wireless network, the cell ID and sector ID servicing the geographical area associated with mobile user (i.e., user device 112 in this example) will be included in the PANI header.

CSCF 114 may forward the call to TAS 116. For example, CSCF 114 may forward the SIP Invite message to TAS 116. TAS 116 may analyze the SIP Invite message to determine whether the call requires location based services or processing (act 520). For example, an N11 call (wherein N may be any integer) or an 8YY call (e.g., a toll free call) may require location based processing so that the call is forwarded to a particular destination based on the location of the caller. In this case, assume that the call is a 611 call that is used by callers to reach the wireless operator's customer care center/help desk and that the 611 call requires location based processing. Alternatively, CSCF 114 may determine that the call involves location based services or processing prior to forwarding the call to TAS 116.

TAS 116 may determine the call origination location by, for example, examining the PANI header sent by user device 112 in the SIP Invite signaling message (act 520). In accordance with an exemplary standard, such as the Third Generation Partnership Project (3GPP) standard, the PANI header in the SIP Invite message may include a 128 bit field identifying the cell ID and sector ID serving the geographic area associated with the calling device (i.e., user device 112 in this example). Based on the cell ID and sector ID in the PANI header, TAS 116 may determine that the origination location of the call is within the coverage area of a specific sector within a specific cell site in network 100. In other implementations, additional parameters and/or other parameters may be used to determine the originating location of the caller.

In some implementations, control logic 310 (FIG. 3) may access translation database 330 to translate the call information input by the caller into an appropriate routable 10 digit number based on the cell ID, sector ID and/or other information included in the PANI header (act 530). For example, a 611 call (which, as described above, may be used for the wireless operator's customer care center/help desk) may be translated to a regular 10 digit telephone number, or translated to an 8YY-XXX-XXXX number assigned to the customer care center. In other cases, the information/digits input by the caller (e.g., a ten digit toll free number) may require no translation.

In each case, TAS 116 may also retrieve a location ID, such as a string of digits, that is assigned to the particular cell ID and sector ID identified in the PANI header (act 530). For example, using the identified cell ID and sector ID, control logic 310 may access location ID database 340 to retrieve a location ID that corresponds to the identified cell ID and sector ID. As described above with respect to FIG. 3, the location IDs in location ID database 340 may be assigned by an operator associated with IMS 110. As also described above, in some instances, the same location ID can be shared by multiple cell ID/sector ID combinations. In other implementations, other location information may be mapped to a location ID. For example, an IP address or WiFi Access Point ID provided by the access network may be mapped to a location ID.

In each case, TAS 116 may modify the SIP Invite message using the retrieved location ID (act 540). For example, in one implementation, control logic 310 may modify the original information in the R-URI field of the SIP Invite message to include the identified location ID. As one example, the location ID may be appended as a prefix to the R-URI. That is, control logic 310 may modify the R-URI to include the following information: Location_ID+Translated_Routing_Number, where the translated routing number corresponds to the translated call information described above with respect to act 530. Alternatively, control logic 310 may modify the R-URI header to include the following information: Location_ID+Originally_input_information, for situations in which no call number translation occurred. In each case, the location ID is appended to the R-URI header. In some implementations, control logic 310 may also provide an indication in the modified SIP Invite message that the number in the R-URI field is not a real phone number (e.g., an E.164 number), such as by indicating that the phone number in the R-RUI header of SIP Invite message is not a real phone number since it includes the location ID. For example, this may be done implicitly by not including the tag "user=phone" to the R-URI header of the SIP Invite message. This may help prevent improper routing of the call by other devices.

TAS 116 may forward the modified SIP Invite message to CSCF 114 (act 540). For example, routing logic 320 may forward the modified SIP Invite message to CSCF 114. CSCF 114 may receive the modified SIP Invite message and identify the call type (act 550).

For example, CSCF 114 may determine the type of call based on information in the R-URI field. The information in the R-URI field may indicate whether the call is a 411 call, a 611 call, an 8YY call, etc. Control logic 410 may examine the information after the location ID in the R-URI header to identify the call type. After the call type is determined, control logic 410 may access MSC database 430 to identify an MSC based on the call type, the cell ID and the sector ID (act 550). As described above, MSC database 430 may store information that identifies MSCs that may be used to handle particular call types and for particular cell IDs and sector IDs. Control logic 410 may access MSC database 430 to identify an appropriate MSC corresponding to the identified call type, cell ID and sector ID.

In this example, assume that control logic 410 retrieves information identifying MSC 130 as the appropriate MSC to handle the particular call type for a caller having a particular cell ID and sector ID. As described above, one MSC may support one type of calls, such as an N11 call, and a different MSC may support other types of calls, such as an 8YY toll free call. As an example, one MSC that has direct connection to an operator service center may service 411 calls and a different MSC that has direct connection to a 8YY service provider may service 8YY calls. In each case, control logic 410 may identify an MSC (also referred to herein as an anchor MSC) for the particular type of call and that serves the appropriate geographic area identified by the cell ID and sector ID. In another implementation, an anchor MSC may handle all types of short code calls, including N11 and 8YY calls.

After the appropriate anchor MSC is identified, control logic 410 may modify the already modified SIP Invite message (act 560). For example, control logic 410 may replace the domain part of the R-URI with the FQDN of the identified anchor MSC (act 560). As described above, MSC database 430 may store FQDNs for each MSC identified in MSC database 430. As an example, for a 411 call, control logic 410 may modify the SIP Invite message to include the following information: <Location ID>411@<FQDN of Anchor MSC for 411>, where 411 represents the original called number input by the caller. As another example, for a 611 call, control logic 410 may modify the SIP Invite message to include the following information: <Location ID>8YY+<last 7 digits of 8YY number>@<FQDN of Anchor MSC for 611>. In this example, the originally input 611 number was translated to a 8YY number (as discussed above with respect to act 530). As still another example, for an 8YY call, control logic 410 may modify the SIP Invite message to include the following information: <Location ID>8YY<last 7 digits of 8YY number>@<FQDN of Anchor MSC for 8YY>, where 8YYXXXXXXX may be the originally input digits. In each case, control logic 410 may replace the domain name portion of the R-URI with the FQDN of the identified anchor MSC.

CSCF 114 may forward the call with the appropriate modified information to the identified MSC (act 560). For example, forwarding logic 420 may forward the call having the following information: Location_ID+Translated_Routing_Number, or Location_ID+original_input/digits toward the anchor MSC. Continuing with the example above in which MSC 130 was identified as the appropriate anchor MSC, CSCF 114 may send the call to SBC 120, which is in the path from CSCF 114 toward MSC 130. In this case, SBC 120 may receive the modified SIP Invite message, identify the destination (i.e., MSC 130 in this example) and forward the call to anchor MSC 130. In some implementations, SBC 120 may perform IP version 6 (IPv6) and IP version 4 (IPv4) conversion and/or SIP/legacy mobile station domain (LMSD) support signaling conversion. Still further, in some implementations, if the anchor MSC (i.e., MSC 130 in this example) does not support VoIP calls, the call may be delivered to a media gateway (MGW)/media gateway control function (MGCF) prior to forwarding to MSC 130. In such a case, the MGW/MGCF may provide the SIP/SS7 signaling conversion.

In each case, MSC 130 may receive the call (i.e., the modified SIP Invite message). As described above, in this example, the call from user device 112 was forwarded from IMS 110 to MSC 130. As a result, MSC 130 may not receive the originating cell ID and sector ID directly from user device 112. However, as also described above, MSC 130 will receive the location ID. MSC 130 may use the location ID to deliver the call to the correct destination (act 570). For example, MSC 130 may route the call the appropriate destination using the location ID and the translated routing number, or the location ID and the originally input call information. In this case, assume that the destination for the call corresponds to destination 140. In this case, MSC 130 may forward the call to destination 140. In some implementations, MSC 130 may strip off the location ID before delivering the call to destination 140.

In this manner, an anchor MSC that serves the geographic area in which user device 112 is located may receive and forward calls to the appropriate destination. As a result, calls requiring location-based processing may be processed in an efficient manner. That is, by providing location identification information in the SIP Invite message, MSC 130 may process calls from an IMS 110 subscriber at user device 112 in a manner similar to that for calls made by subscribers served directly by MSC 130.

Implementations described herein provide for handling calls that require routing based on the location of the caller or subscriber. The calls may be forwarded to a mobile switching center such that the mobile switching center will be able to forward the call to the intended destination in an efficient manner. This may allow for efficient utilisation of existing resources in routing calls requiring routing based on the location of the caller.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in the implementations described above, CSCF 114 and TAS 116 were described as being involved in portions of the processing associated with routing calls. In alternative implementations, IMS 110 may not include both of these components, such as TAS 116. In such implementations, CSCF 114 may perform the processing described above as being performed by TAS 116 or TAS 116 may perform the processing described above as being performed by CSCF 114.

In addition, three databases (i.e., translation database 330, location ID database 340 and MSC database 430) were described as being used to aid in routing calls. In other implementations, two or more of these databases may be combined or integrated into a single database.

Still further, in the implementation described above, SBC 120 was described as being an intermediate destination associated with a call being forwarded to MSC 130. In other implementations, SBC 120 may not be used. For example, in situations in which IMS 110 and the circuit switched network associated with MSC 130 are owned/operated by the same service provider, SBC 120 may not be needed between the boundary of the two networks. Implementations described above also refer to receiving a VoIP call implemented via SIP.

In other implementations, call signaling messages transmitted in accordance with other protocols, such as H.323, may be processed in a similar manner by IMS 110.

In addition, various types of calls (e.g., N11 calls, 8YY calls, etc.) were described in the examples above. In other implementations, other types of calls that require location based processing may be handled in a similar manner. For example, a short code such as "pizza" entered from user device 112 may be handled in a similar manner to that described above. For example, the short code "pizza" may be used to identify and forward a call to the closest pizza chain restaurant or other local pizza restaurant based on the location of user device 112.

Still further, while series of acts have been described with respect to FIG. 5, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessors, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
receiving, from a user device, a session initiation protocol (SIP) Invite message associated with a call;
determining that the call involves location based processing, wherein the location based processing includes routing the call to a final destination based on a location of the user device, wherein the determining that the call involves location based processing comprises:
determining that the call corresponds to one of an N11 call, where N represents an integer, a toll free call, or a short code call;
identifying location information associated with the user device based on header information included in the SIP Invite message, wherein the location information includes at least one of a cell identifier (ID) or a sector identifier (ID);
accessing a database to identify a location identifier (ID) corresponding to at least one of the cell ID or sector ID;
modifying the SIP Invite message to include the identified location ID, wherein the modifying the SIP Invite message comprises:
appending the location ID to a request Uniform Resource Identifier (R-URI) header, wherein the modified SIP Invite message indicates that a number in the R-URI header is not a real phone number;
identifying a call type associated with the call based on information in the R-URI header; and
identifying a mobile switching center to which the SIP Invite message is to be forwarded based on the call type and the location information.

2. The method of claim 1, wherein the modifying the SIP Invite message further comprises:
appending the location ID as a prefix to the R-URI header.

3. The method of claim 1, further comprising:
inserting a fully qualified domain name (FQDN) associated with the identified mobile switching center into the modified SIP Invite message.

4. The method of claim 3, further comprising:
forwarding the SIP Invite message with the location ID and the FQDN of the identified mobile switching center toward the identified mobile switching center.

5. The method of claim 1, wherein the determining that the call involves location based processing further includes:
examining a request Uniform Resource Identifier header of the SIP Invite message to determine whether the call comprises an N11 call, a toll free call or a short code call.

6. The method of claim 1, wherein the identifying location information comprises:
examining a P-Access Network Identifier header of the SIP Invite message to identify a cell ID and sector ID.

7. The method of claim 1, further comprising:
translating original call information input by a user placing the call into a ten digit telephone number.

8. The method of claim 1, wherein the identifying a call type comprises:
identifying the call type based on information included in the SIP Invite message.

9. The method of claim 1, further comprising:
forwarding the modified SIP Invite message to the identified mobile switching center, and
determining, by the mobile switching center, a destination location associated with the call based on the location ID.

10. The method of claim 1, wherein the method is implemented as computer-executable instructions embodied on a non-transitory computer-readable memory device.

11. A method, comprising:
receiving, by a first device and from a user device, a call initiation message associated with a call;
determining, by the first device, that the call involves location based processing, wherein the location based processing includes routing the call to a final destination based on a location of the user device;
forwarding, by the first device, the call initiation message to a second device;
identifying, by the second device, call location information corresponding to the location of the user device based on header information included in the call initiation message, herein the call location information includes at least one of a cell identifier (ID) or a sector identifier (ID);
accessing, by the second device, a database to identify a location identifier (ID) based on at least one of the cell ID or sector ID;

modifying, by the second device, the call initiation message to include the identified location ID;
forwarding, by the second device, the modified call initiation message to the first device;
identifying, by the first device, a call type associated with the call; and
identifying, by the first device, a first mobile switching center to which the call initiation message is to be forwarded based on the call type and call location information.

12. The method of claim 11, further comprising:
inserting, by the second device, a fully qualified domain name (FQDN) associated with the first mobile switching center into the modified call initiation message;
forwarding the modified call initiation message with the FQDN associated with the first mobile switching center toward the first mobile switching center; and
forwarding, by the first mobile switching center, the call to the final destination.

13. A system comprising:
at least one device configured to:
receive a session initiation protocol (SIP) Invite message associated with a call from a caller,
determine that the call involves location based processing, wherein the location based processing includes routing the call to a final destination based on a location of the caller,
identify the caller's location based on header information included in the SIP Invite message, wherein the header information includes at least one of a cell identifier (ID) or a sector identifier (ID),
access a first database to identify a location identifier (ID) corresponding to the caller's location based on at least one of the cell ID or sector ID, and
insert the identified location ID in the SIP Invite message.

14. The system of claim 13, wherein the at least one device is further configured to:
identify a call type associated with the call, and
access a second database to identify a first mobile switching center based on a cell ID, a sector ID and the call type associated with the call.

15. The system of claim 14, wherein the at least one device is further configured to:
insert a fully qualified domain name (FQDN) associated with the first mobile switching center into the SIP Invite message, and
forward the SIP Invite message including the location ID and the FQDN associated with the first mobile switching center to the first mobile switching center.

16. The system of claim 13, wherein the at least one device is further configured to:
examine a request Uniform Resource Identifier header of the SIP Invite message to determine whether the call comprises a toll free call, a short code call or an N11 call, where N represents an integer.

17. The system of claim 13, wherein when identifying the caller's location, the at least one device is configured to:
examine a P-Access Network Identifier header of the SIP Invite message to identify a cell ID and sector ID.

18. The system of claim 13, wherein the at least one device is further configured to:
access a second database to identify a ten digit telephone number associated with call information input by a user placing the call, and
insert the ten digit telephone number in the SIP Invite message.

19. The system of claim 13, wherein the at least one device comprises:
a call session control function component, and
a telephone application component.

* * * * *